United States Patent
Otani et al.

(10) Patent No.: US 12,542,242 B2
(45) Date of Patent: Feb. 3, 2026

(54) METHOD FOR MANUFACTURING MULTILAYER CERAMIC ELECTRONIC COMPONENT, AND MULTILAYER CERAMIC ELECTRONIC COMPONENT

(71) Applicant: Murata Manufacturing Co., Ltd., Nagaokakyo (JP)

(72) Inventors: Shinji Otani, Nagaokakyo (JP); Hidehiko Tanaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 36 days.

(21) Appl. No.: 18/116,430

(22) Filed: Mar. 2, 2023

(65) Prior Publication Data

US 2023/0207222 A1   Jun. 29, 2023

Related U.S. Application Data

(62) Division of application No. 17/031,971, filed on Sep. 25, 2020, now Pat. No. 11,626,250.

(30) Foreign Application Priority Data

Sep. 30, 2019   (JP) .................. 2019-179630

(51) Int. Cl.
*H01G 4/30* (2006.01)
*H01G 4/012* (2006.01)

(52) U.S. Cl.
CPC ............... *H01G 4/30* (2013.01); *H01G 4/012* (2013.01); *Y10T 29/435* (2015.01)

(58) Field of Classification Search
CPC ......... H01G 4/30; H01G 4/012; Y10T 29/435
See application file for complete search history.

(56) References Cited

U.S. PATENT DOCUMENTS

| | | | |
|---|---|---|---|
| 10,141,114 B2* | 11/2018 | Ono | H01G 4/224 |
| 10,249,438 B1* | 4/2019 | Byun | H05K 1/11 |
| 10,332,685 B2* | 6/2019 | Kim | H01G 4/30 |
| 10,347,421 B2* | 7/2019 | Chung | H01C 7/10 |
| 10,453,610 B2* | 10/2019 | Fukunaga | H01G 4/1227 |

(Continued)

FOREIGN PATENT DOCUMENTS

| | | | | |
|---|---|---|---|---|
| CN | 108288542 A | * | 7/2018 | ............. H01G 4/005 |
| JP | 2006100754 A | * | 4/2006 | |

OTHER PUBLICATIONS

Translation of JP-2006100754-A (Year: 2006).*

(Continued)

*Primary Examiner* — Jeffrey T Carley
(74) *Attorney, Agent, or Firm* — Keating & Bennett, LLP

(57) ABSTRACT

A method for manufacturing a multilayer ceramic electronic component includes preparing a ceramic green sheet, forming a plurality of internal electrode patterns on a main surface of the ceramic green sheet, applying a ceramic paste above the main surface of the ceramic green sheet, stacking a plurality of the ceramic green sheets, pressing the plurality of stacked ceramic green sheets, and cutting the plurality of pressed ceramic green sheets. The ceramic paste at least partially overlaps end portions of the internal electrode patterns, and a stepped region is provided on the ceramic green sheet. When cutting the ceramic green sheets in a first direction, the cutting is performed at a position of the stepped region between two of the internal electrode patterns adjacent to each other in a second direction.

3 Claims, 11 Drawing Sheets

(56) References Cited

U.S. PATENT DOCUMENTS

| | | | |
|---|---|---|---|
| 11,017,947 B2* | 5/2021 | Chigira | H01G 13/00 |
| 11,017,949 B2* | 5/2021 | Kato | H01G 4/232 |
| 11,322,307 B2* | 5/2022 | Fukunaga | H01G 4/012 |
| 11,349,449 B2* | 5/2022 | Yamamoto | H03H 3/00 |
| 2006/0214263 A1* | 9/2006 | Kojima | H01G 4/30 257/532 |
| 2006/0215349 A1* | 9/2006 | Lee | H01G 4/232 361/311 |
| 2006/0221542 A1* | 10/2006 | Lee | H01G 4/30 361/301.4 |
| 2008/0304204 A1* | 12/2008 | Suzuki | H01G 4/30 361/321.3 |
| 2010/0038120 A1* | 2/2010 | Kojima | H01G 4/30 156/89.12 |
| 2011/0141656 A1* | 6/2011 | Yun | H01G 4/005 29/25.42 |
| 2012/0048452 A1* | 3/2012 | Suh | H01G 4/30 156/89.12 |
| 2012/0140377 A1* | 6/2012 | Kim | H01G 4/30 361/321.2 |
| 2012/0262840 A1* | 10/2012 | Koizumi | H01G 4/12 361/321.2 |
| 2014/0043720 A1* | 2/2014 | Hwang | H01G 4/30 156/89.18 |

OTHER PUBLICATIONS

Otani et al., "Method for Manufacturing Multilayer Ceramic Electronic Component, and Multilayer Ceramic Electronic Component", U.S. Appl. No. 17/031,971, filed Sep. 25, 2020.

Otani et al., "Method for Manufacturing Multilayer Ceramic Electronic Component, and Multilayer Ceramic Electronic Component", U.S. Appl. No. 18/769,737, filed Jul. 11, 2024.

* cited by examiner

METHOD FOR MANUFACTURING MULTILAYER CERAMIC ELECTRONIC COMPONENT, AND MULTILAYER CERAMIC ELECTRONIC COMPONENT

CROSS REFERENCE TO RELATED APPLICATIONS

This application claims the benefit of priority to Japanese Patent Application No. 2019-179630 filed on Sep. 30, 2019. The entire contents of this application are hereby incorporated herein by reference.

BACKGROUND OF THE INVENTION

1. Field of the Invention

The present invention relates to a method for manufacturing a multilayer ceramic electronic component and the multilayer ceramic electronic component.

2. Description of the Related Art

In recent years, various multilayer ceramic electronic components typified by a multilayer ceramic capacitor, which use the characteristics of a ceramic material, have been widely used.

As a method for manufacturing such a multilayer ceramic electronic component, a method is widely known for manufacturing a multilayer ceramic electronic component through steps of stacking and pressing ceramic green sheets each having internal electrode patterns formed thereon which will serve as internal electrodes after firing.

In this manufacturing method, however, a stepped region in which the internal electrode patterns are not formed is present on each ceramic green sheet. Therefore, end portions of the internal electrode patterns may be deformed when the stacked ceramic green sheets are pressed.

In order to suppress such deformation of the end portions of the internal electrode patterns, Japanese Patent Laid-Open No. 2003-209025 describes a method of forming internal electrode patterns on a ceramic green sheet and applying step-smoothing ceramic paste to a stepped region, and thereafter stacking the ceramic green sheets.

In the method of applying step-smoothing ceramic paste to a stepped region, however, the step-smoothing ceramic paste may be applied to extend onto internal electrode patterns due to printing misalignment, resulting in the promotion of a step.

SUMMARY OF THE INVENTION

Preferred embodiments of the present invention provide methods for manufacturing a multilayer ceramic electronic component, by which the deformation of end portions of internal electrode patterns is able to be significantly reduced or prevented and the promotion of a step due to printing misalignment is able to be significantly reduced or prevented, and multilayer ceramic electronic components.

A method for manufacturing a multilayer ceramic electronic component according to a preferred embodiment of the present invention includes preparing a ceramic green sheet; forming a plurality of internal electrode patterns on a main surface of the ceramic green sheet; applying a ceramic paste above the main surface of the ceramic green sheet; stacking a plurality of the ceramic green sheets on which the internal electrode patterns have been formed and to which the ceramic paste has been applied; pressing the plurality of stacked ceramic green sheets; and cutting the plurality of pressed ceramic green sheets. The forming of the internal electrode patterns and the applying of the ceramic paste are performed such the ceramic paste at least partially overlaps end portions of the internal electrode patterns, and a stepped region, in which the internal electrode patterns are not formed and to which the ceramic paste is not applied, is provided on the main surface of the ceramic green sheet. In the cutting of the ceramic green sheets, when cutting the ceramic green sheets in a first direction, the cutting is performed at a position of the stepped region between two of the internal electrode patterns adjacent to each other in a second direction orthogonal or substantially orthogonal to the first direction.

A multilayer ceramic electronic component according to a preferred embodiment of the present invention is a multilayer ceramic electronic component having a structure including a stack of a plurality of ceramic layers and a plurality of internal electrodes, the multilayer ceramic electronic component including the plurality of ceramic layers; the plurality of internal electrodes; and an electrode-end-portion protecting portion including a ceramic material and at least partially overlapping each end portion of the plurality of internal electrodes. The electrode-end-portion protecting portion is not exposed at a surface of the multilayer ceramic electronic component.

A multilayer ceramic electronic component according to another preferred embodiment of the present invention is a multilayer ceramic electronic component having a structure including a stack of a plurality of ceramic layers and a plurality of internal electrodes, the multilayer ceramic electronic component including the plurality of ceramic layers; and the plurality of internal electrodes. The plurality of ceramic layers include an internal-layer ceramic layer provided between two of the plurality of internal electrodes adjacent to each other in a stacking direction, and an external-layer ceramic layer located on an outer side in the stacking direction relative to one of the plurality of internal electrodes that is located on an outermost side in the stacking direction, and when a surface at a central position of the internal electrode located on the outermost side in the stacking direction is defined as a reference surface, an angle between the reference surface and an end portion of the internal electrode located on the outermost side in the stacking direction is defined as $\theta_1$, and an angle between the reference surface and an interface between the external-layer ceramic layer and the internal-layer ceramic layer is defined as $\theta_2$, a difference between $\theta_2$ and $\theta_1$ ($\theta_2 - \theta_1$) is more than about 2°.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below to illustrate features of the present invention.

The features, components, and elements of multilayer ceramic electronic component according to preferred embodiments of the present invention will be described first, followed by a description of methods for manufacturing the multilayer ceramic electronic component according to preferred embodiments of the present invention. Herein, a multilayer ceramic capacitor will be described as an example of a multilayer ceramic electronic component. However, the multilayer ceramic electronic component is not limited to a multilayer ceramic capacitor, and may be a varistor, an inductor, a thermistor, a multilayer coil or the like, for example.

Figure 1:
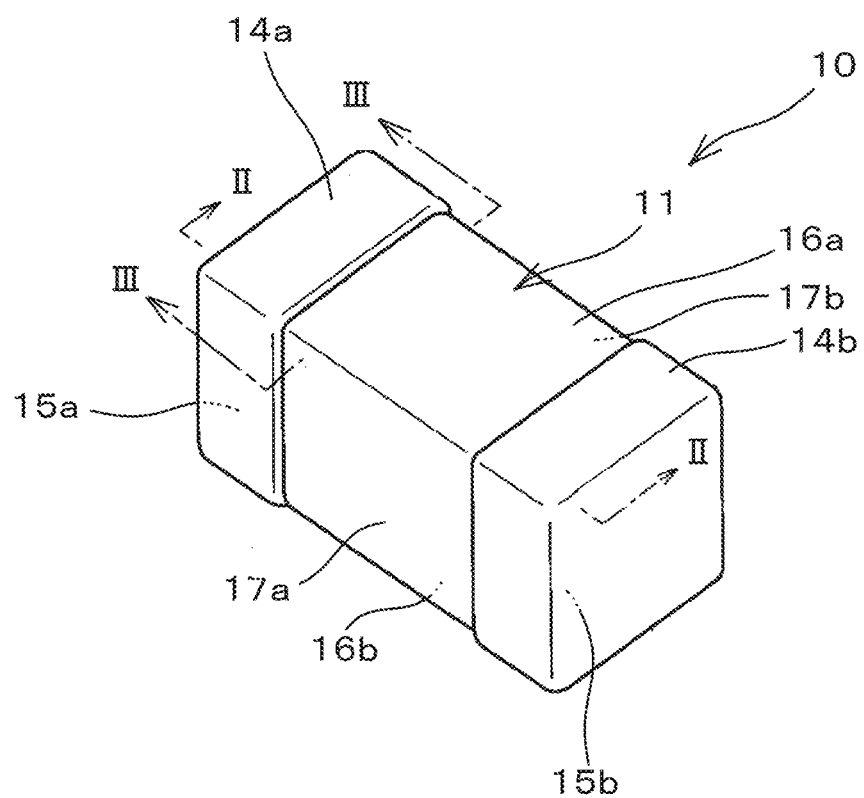
FIG. 1 is a perspective view of a multilayer ceramic capacitor which is an example of a multilayer ceramic electronic component according to a preferred embodiment of the present invention.
Figure 1:
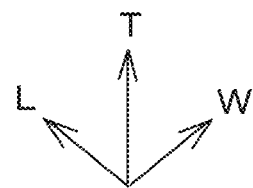
Figure 2:
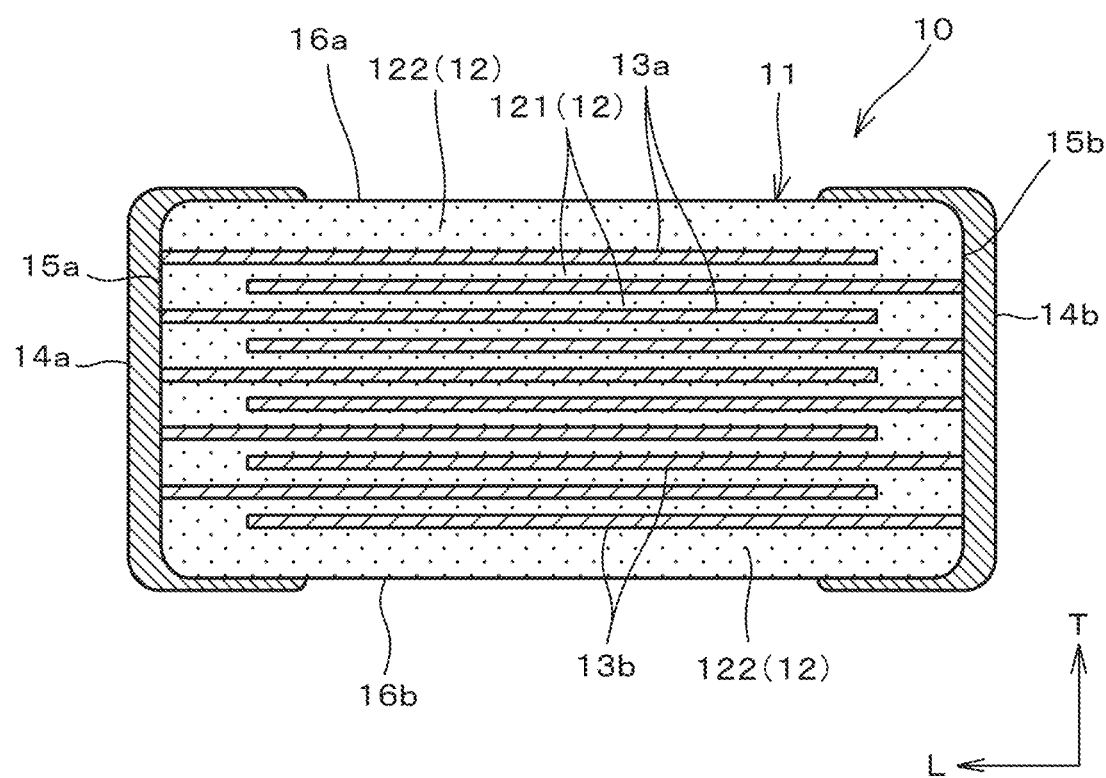
FIG. 2 is a cross-sectional view of the multilayer ceramic capacitor shown in FIG. 1 taken along line II-II.
Figure 3:
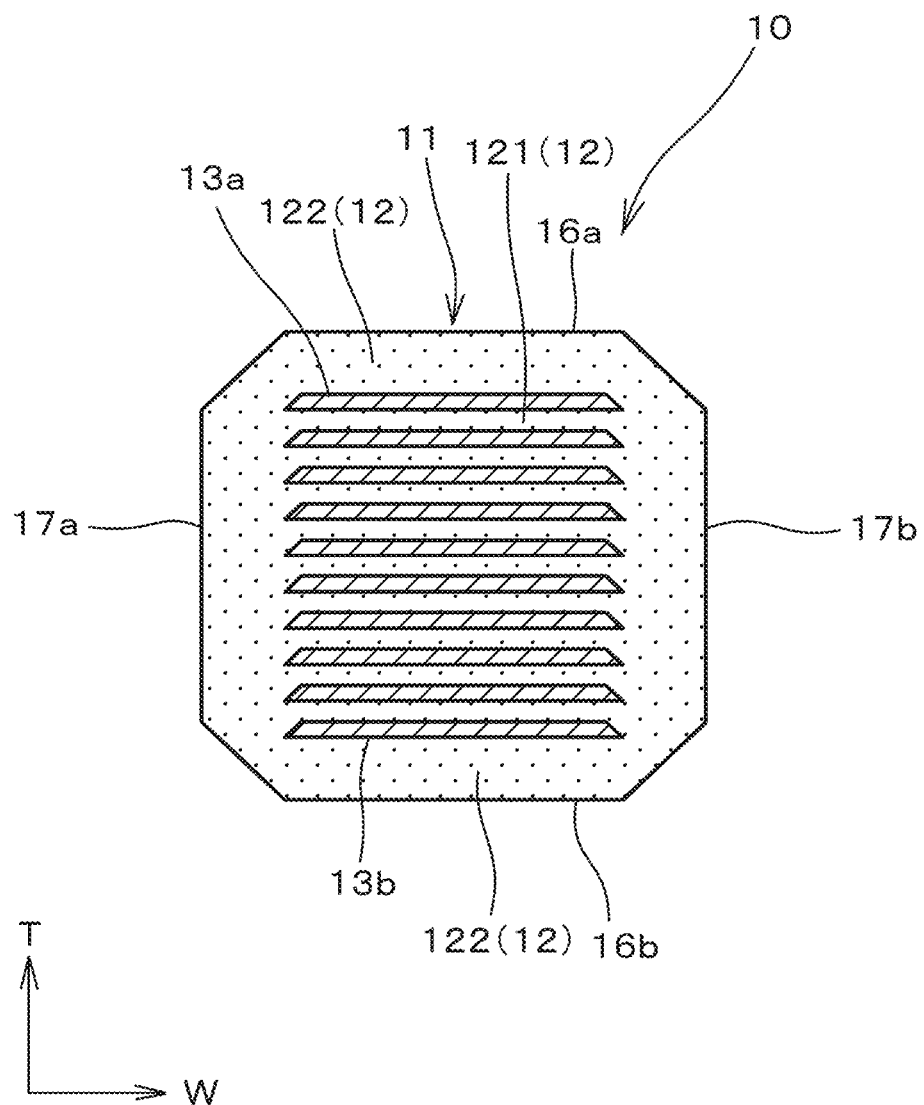
FIG. 3 is a cross-sectional view of the multilayer ceramic capacitor shown in FIG. 1 taken along line III-III.

FIG. 1 is a perspective view of a multilayer ceramic capacitor 10 which is an example of a multilayer ceramic electronic component according to a preferred embodiment of the present invention. FIG. 2 is a cross-sectional view of multilayer ceramic capacitor 10 shown in FIG. 1 taken along line II-II. FIG. 3 is a cross-sectional view of multilayer ceramic capacitor 10 shown in FIG. 1 taken along line III-III.

Multilayer ceramic capacitor 10 includes a stack 11 and a pair of external electrodes 14a and 14b. The pair of external electrodes 14a and 14b are opposed to each other as shown in FIG. 1.

Herein, the direction in which the pair of external electrodes 14a and 14b are opposed to each other is defined as a length direction L of multilayer ceramic capacitor 10, a direction in which ceramic layers 12 and internal electrodes 13a and 13b, which will be described below, are stacked is defined as a stacking direction T, and a direction orthogonal or substantially orthogonal to both of length direction L and stacking direction T is defined as a width direction W.

Stack 11 includes a first end surface 15a and a second end surface 15b facing each other in length direction L, a first main surface 16a and a second main surface 16b facing each other in stacking direction T, and a first lateral surface 17a and a second lateral surface 17b facing each other in width direction W.

Preferably, for example, stack 11 has rounded or obtuse corners and rounded or obtuse ridges. Herein, the corner is a portion at which three surfaces of stack 11 meet together, and the ridge is a portion at which two surfaces of stack 11 meet together.

As shown in FIGS. 2 and 3, stack 11 has a structure including a stack of the plurality of ceramic layers 12 and the plurality of internal electrodes 13a and 13b.

Internal electrodes 13a and 13b include first internal electrodes 13a and second internal electrodes 13b. Ceramic layers 12 include internal-layer ceramic layers 121, each interposed between two internal electrodes 13a and 13b adjacent to each other in stacking direction T, that is, between first internal electrode 13a and second internal electrode 13b, and external-layer ceramic layers 122 located on outer sides in stacking direction T relative to internal electrodes 13a and 13b located on the outermost sides in stacking direction T. More specifically, stack 11 has a structure in which the plurality of first internal electrodes 13a and second internal electrodes 13b are stacked alternately in stacking direction T with internal-layer ceramic layer 121 therebetween, and in which external-layer ceramic layers 122 are provided on the opposite outer sides in stacking direction T.

Ceramic layer 12 is preferably made of, for example, a ceramic material mainly including $BaTiO_3$, $CaTiO_3$, $SrTiO_3$, $CaZrO_3$, or the like. Internal-layer ceramic layer 121 and external-layer ceramic layer 122 may be made of the same material or different materials.

First internal electrode 13a and second internal electrode 13b preferably include, for example, a metal such as Ni, Cu, Ag, Pd, and Au or an alloy of Ag and Pd. First internal electrode 13a and second internal electrode 13b may further include dielectric particles having the same or similar composition as the composition of the ceramic included in ceramic layer 12.

First internal electrodes 13a are extended to first end surface 15a of stack 11. Second internal electrodes 13b are extended to second end surface 15b of stack 11.

First external electrode 14a is provided on first end surface 15a of stack 11. In the present preferred embodiment, first external electrode 14a is provided over the entire or substantially the entire first end surface 15a of stack 11 and also wraps around first main surface 16a, second main surface 16b, first lateral surface 17a, and second lateral surface 17b from first end surface 15a. First external electrode 14a is electrically connected with first internal electrodes 13a.

Second external electrode 14b is provided on second end surface 15b of stack 11. In the present preferred embodiment, second external electrode 14b is provided over the entire or substantially the entire second end surface 15b of stack 11 and wraps around first main surface 16a, second main surface 16b, first lateral surface 17a, and second lateral surface 17b from second end surface 15b. Second external electrode 14b is electrically connected with second internal electrodes 13b.

First external electrode 14a and second external electrode 14b preferably include, for example, a metal such as Ni, Cu, Ag, Pd, a Ag—Pd alloy, or Au. A plating layer may be provided on the surface of each of first external electrode 14a and second external electrode 14b.

Figure 4:
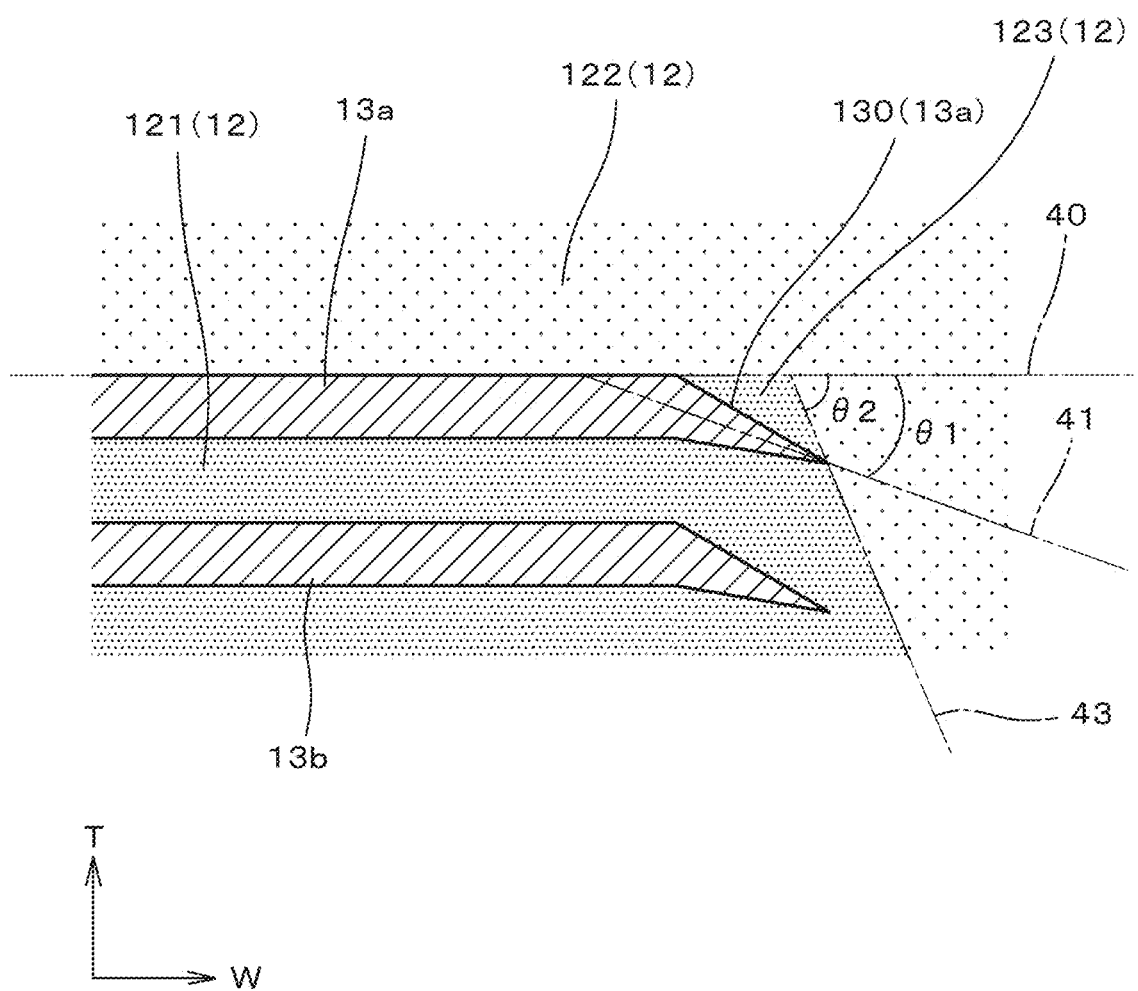
FIG. 4 is an enlarged view, in the cross-sectional view shown in FIG. 3, around an end portion of one of first internal electrodes in a width direction, the one of the first internal electrodes being located on the outermost side in a stacking direction.

FIG. 4 is an enlarged view, in the cross-sectional view shown in FIG. 3, around an end portion 130 of one of first internal electrodes 13a in width direction W, the one of first internal electrodes 13a being located on the outermost side in stacking direction T. As shown in FIG. 4, end portion 130 of first internal electrode 13a has a structure that decreases in thickness toward an outer side in width direction W.

When a surface at a central position of first internal electrode 13a located on the outermost side in stacking direction T is defined as a reference surface 40, an angle between reference surface 40 and end portion 130 of first internal electrode 13a located on the outermost side in stacking direction T is defined as θ1. More specifically, angle θ1 between reference surface 40 and end portion 130 of first internal electrode 13a located on the outermost side in stacking direction T is an angle between reference surface 40 and a middle surface 41 that bisects the thickness of end portion 130 of first internal electrode 13a located on the outermost side in stacking direction T, as shown in FIG. 4. Angle θ1 is preferably about 0° or more and about 15° or less, for example.

Angle θ1 described above and an angle θ2 which will be described below are similarly defined at end portion 130 of internal electrode 13a located on the outermost side in stacking direction T opposite to that shown in FIG. 4. Although first internal electrode 13a has been described above as being present on the outermost side in stacking direction T, similar features apply when second internal electrode 13b is provided on the outermost side in stacking direction T.

An angle between above-described reference surface 40 and an interface 43 between external-layer ceramic layer 122 and internal-layer ceramic layer 121 is defined as θ2. When an angle between external-layer ceramic layer 122 and internal-layer ceramic layer 121 has stepwise changes, an angle adjacent to or in a vicinity of first lateral surface 17a or second lateral surface 17b is defined as θ2. Angle θ2 is preferably about 2° or more and about 60° or less, for example.

Note that interface 43 between external-layer ceramic layer 122 and internal-layer ceramic layer 121 is shown to facilitate visibility in FIG. 4. When external-layer ceramic layer 122 and internal-layer ceramic layer 121 include different materials, for example, interface 43 between external-layer ceramic layer 122 and internal-layer ceramic layer 121 is able to be identified.

A difference between above-described angle θ2 and angle θ1 (θ2−θ1) is preferably more than about 2° and less than about 60°, for example.

Herein, multilayer ceramic capacitor 10 according to the present preferred embodiment includes an electrode-end-portion protecting portion 123, which is made of a ceramic material and at least partially overlaps each end portion 130 of internal electrodes 13a and 13b. The electrode-end-portion protecting portion 123 is provided by firing of ceramic paste applied to at least partially overlap end portions of internal electrode patterns, in a method for manufacturing the multilayer ceramic electronic component which will be described below. However, electrode-end-portion protecting portion 123 may not be provided at end portions 130 of internal electrodes 13a and 13b located on the outermost sides in stacking direction T.

Electrode-end-portion protecting portion 123 protects the end portions of internal electrodes 13a and 13b, and is not exposed at a surface of multilayer ceramic capacitor 10 which is a multilayer ceramic electronic component. The ceramic material forming electrode-end-portion protecting portion 123 may be the same as or different from the ceramic material forming internal-layer ceramic layer 121 and the ceramic material forming external-layer ceramic layer 122.

Multilayer ceramic capacitor 10 in the present preferred embodiment is able to be manufactured with the manufacturing method which will be described below. The above-described electrode-end-portion protecting portion is not included in a multilayer ceramic capacitor manufactured with a conventional manufacturing method which does not include step S3 of manufacturing steps in a flowchart shown in FIG. 5 which will be described below, that is, a step of applying ceramic paste with the paste at least partially overlapping the end portions of the internal electrode patterns. In addition, in the multilayer ceramic capacitor manufactured with the conventional manufacturing method which does not include step S3, each of above-described angle θ1 and angle θ2 increases to a maximum of about 60° as the number of stacked sheets increases, and the difference between them (θ2−θ1) is about 2° or less, for example.

In addition, as described in Japanese Patent Laid-Open No. 2003-209025, the above-described electrode-end-portion protecting portion is not included, either, in a multilayer ceramic capacitor manufactured through steps of forming internal electrode patterns on a ceramic green sheet and applying step-smoothing ceramic paste to a stepped region in which the internal electrode patterns are not formed. In addition, the end portion is rendered substantially flat irrespective of the number of stacked sheets, each of above-described angle θ1 and angle θ2 is a maximum of about 15°, and the difference between them (θ2−θ1) is about 2° or less. During the manufacture of this multilayer ceramic capacitor, the step-smoothing ceramic paste may be applied onto the end portions of the internal electrode patterns, in which case a ceramic layer provided by firing of the step-smoothing ceramic paste is exposed at a surface of the multilayer ceramic capacitor.

That is, that the difference between above-described angle θ2 and angle θ1 (θ2−θ1) is more than about 2°, and including electrode-end-portion protecting portion 123 are inherent features of the multilayer ceramic electronic component manufactured with the manufacturing method according to a preferred embodiment of the present invention which will be described below.

A method for manufacturing a multilayer ceramic electronic component in a first preferred embodiment of the present invention is described below. The multilayer ceramic electronic component is a multilayer ceramic capacitor, for example, but may be a varistor, an inductor, a thermistor, a multilayer coil or the like, without being limited to a multilayer ceramic capacitor.

Figure 5:
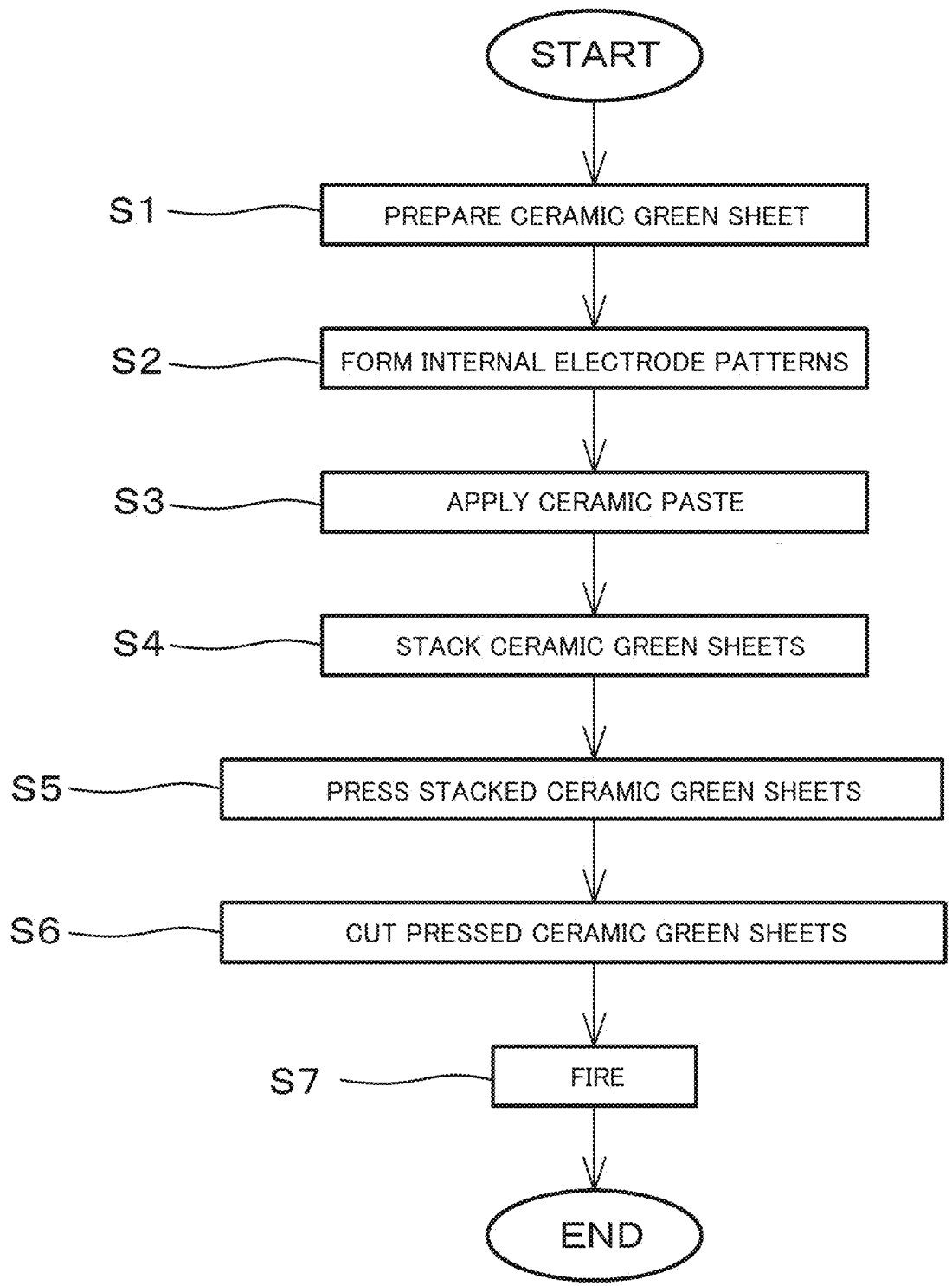
FIG. 5 is a flowchart showing a method for manufacturing a multilayer ceramic electronic component according to a first preferred embodiment of the present invention.

FIG. 5 is a flowchart showing the method for manufacturing the multilayer ceramic electronic component according to the first preferred embodiment.

Figure 6A:
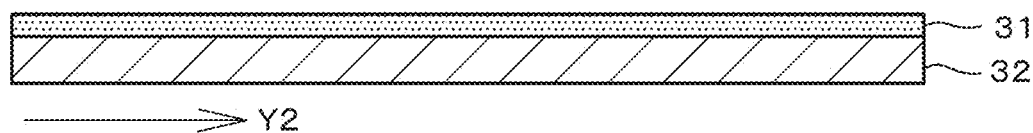
FIGS. 6A to 6D show manufacturing steps of the method for manufacturing the multilayer ceramic electronic component in the first preferred embodiment of the present invention.

In step S1, a ceramic green sheet 31 is prepared (see FIG. 6A). Ceramic green sheet 31 may be a publicly known one. FIG. 6A shows ceramic green sheet 31 formed on a support film 32. For example, ceramic green sheet 31 is able to be formed by applying ceramic slurry in the form of a sheet onto support film 32. The ceramic slurry may preferably include, for example, adding polyvinyl butyral (PVB) resin, a plasticizer, a dispersant, an organic solvent and the like to a ceramic material, followed by wet mixing. Support film 32 is preferably a PET film, for example.

Figure 6B:
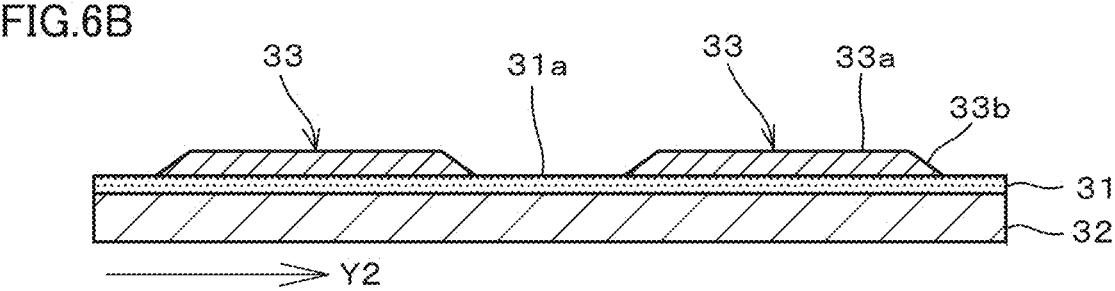

In step S2, a plurality of internal electrode patterns 33 are formed on a main surface 31a of ceramic green sheet 31 (see FIG. 6B). Internal electrode patterns 33 are able to be formed by printing on ceramic green sheet 31 with conductive paste for internal electrodes including conductive material forming internal electrodes. The conductive paste for internal electrodes is able to be printed by gravure printing, for example. However, a method of printing the conductive paste for internal electrodes is not limited to gravure printing, and other printing methods, for example, screen printing and ink jet printing, may be applied.

As shown in FIG. 6B, internal electrode pattern 33 includes a main portion 33a having a constant or substantially constant thickness, and an end portion 33b located on an outer side of main portion 33a and having a smaller thickness than main portion 33a. End portion 33b of internal electrode pattern 33 has an inclined shape that decreases in thickness outwardly, that is, with increasing distance from main portion 33a. Taking FIG. 4 as an example, end portion 33b of internal electrode pattern 33 corresponds to end portion 130 of first internal electrode 13a.

Figure 6C:
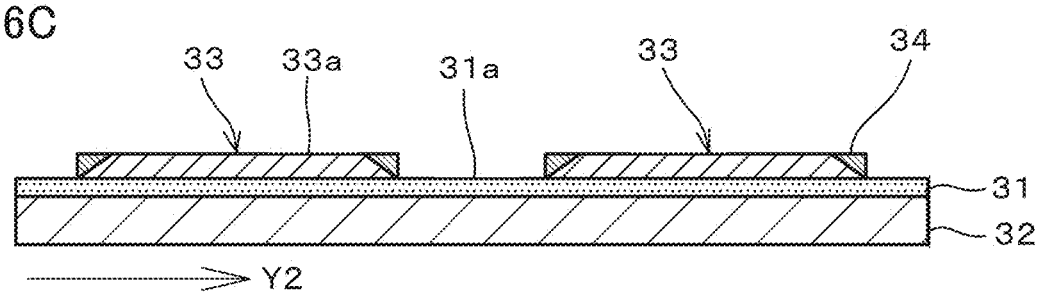

In step S3, a ceramic paste 34 is applied above main surface 31a of ceramic green sheet 31 (see FIG. 6C). Ceramic paste 34 may be made of a material the same as or different from the material ceramic green sheet 31. For example, when the ceramic slurry that forms ceramic green sheet 31 includes PVB resin, ceramic paste 34 including another resin such as ethyl cellulose resin instead of PVB resin may be applied. An amount of plastic deformation of ceramic paste 34 is greater than an amount of plastic deformation of the conductive paste for internal electrodes that form internal electrode patterns 33.

Ceramic paste 34 is applied to at least partially overlap end portion 33b of internal electrode pattern 33. In the first preferred embodiment, since ceramic paste 34 is applied after internal electrode pattern 33 has been formed, ceramic paste 34 is applied onto end portion 33b of internal electrode pattern 33. Ceramic paste 34 is also applied and a stepped region 35 which will be described below is provided on main surface 31a of ceramic green sheet 31.

Ceramic paste 34 is able to be applied by gravure printing, for example. However, a method of applying ceramic paste 34 is not limited to gravure printing, and other printing methods, for example, screen printing, ink jet printing and sheet transfer printing, may be applied.

Figure 7:
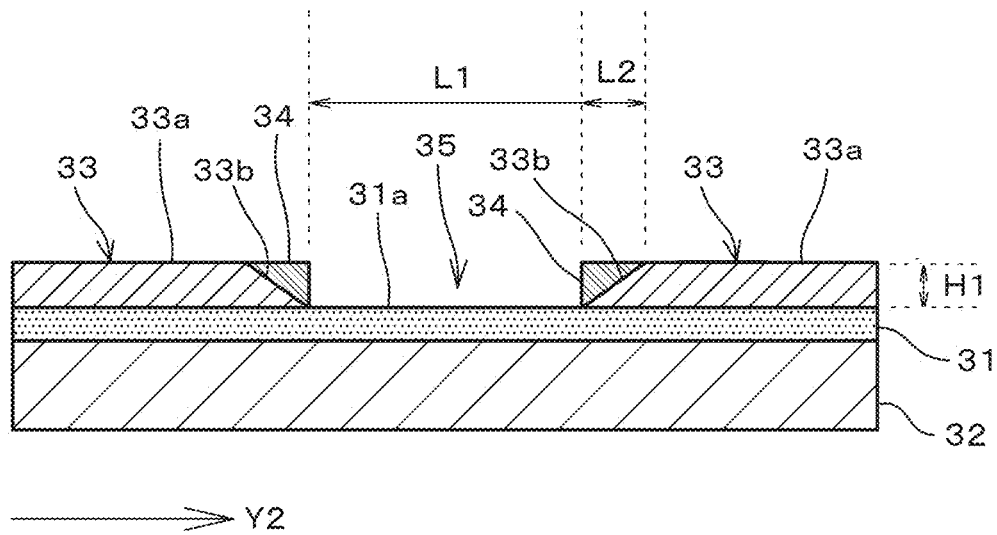
FIG. 7 is an enlarged cross-sectional view around an end portion of an internal electrode pattern to which ceramic paste has been applied.

FIG. 7 is an enlarged cross-sectional view around end portion 33b of internal electrode pattern 33 to which ceramic paste 34 has been applied. FIG. 7 shows an example where ceramic paste 34 has been applied only onto end portion 33b of internal electrode pattern 33. Ceramic paste 34 defines and functions as an electrode-end-portion protecting portion that at least partially overlaps the end portion of the internal electrode in a completed multilayer ceramic electronic component.

Preferably, for example, the position where ceramic paste 34 is applied has a height the same or substantially the same as a height H1 of main portion 33a of internal electrode pattern 33. Height H1 of main portion 33a of internal electrode pattern 33 is preferably about 0.5 µm or more and about 3.0 µm or less, for example.

As shown in FIG. 7, on main surface 31a of ceramic green sheet 31, stepped region 35 in which internal electrode pattern 33 is not formed and to which ceramic paste 34 is not applied is provided. In a step of cutting ceramic green sheets 31 which will be described below, when cutting ceramic green sheets 31 in a first direction, the cutting is performed in stepped region 35 between two internal electrode patterns 33 adjacent to each other in a second direction Y2 orthogonal or substantially orthogonal to the first direction. In the first preferred embodiment, the first direction refers to a direction in which two external electrodes are opposed to each other (length direction L in FIG. 1), and second direction Y2 refers to a direction orthogonal or substantially orthogonal to both of the first direction and stacking direction T (width direction W in FIG. 1). When two external electrode are opposed to each other in width direction W, the first direction refers to width direction W, and second direction Y2 refers to length direction L.

A distance L1 between two internal electrode patterns 33 adjacent to each other in second direction Y2 is preferably about 120 µm or more and about 500 µm or less, for example. A dimension L2 of end portion 33b of internal electrode pattern 33 in second direction Y2 is preferably about 50 µm or more and about 100 µm or less, for example. This may also be the case in the first direction.

Figure 8:
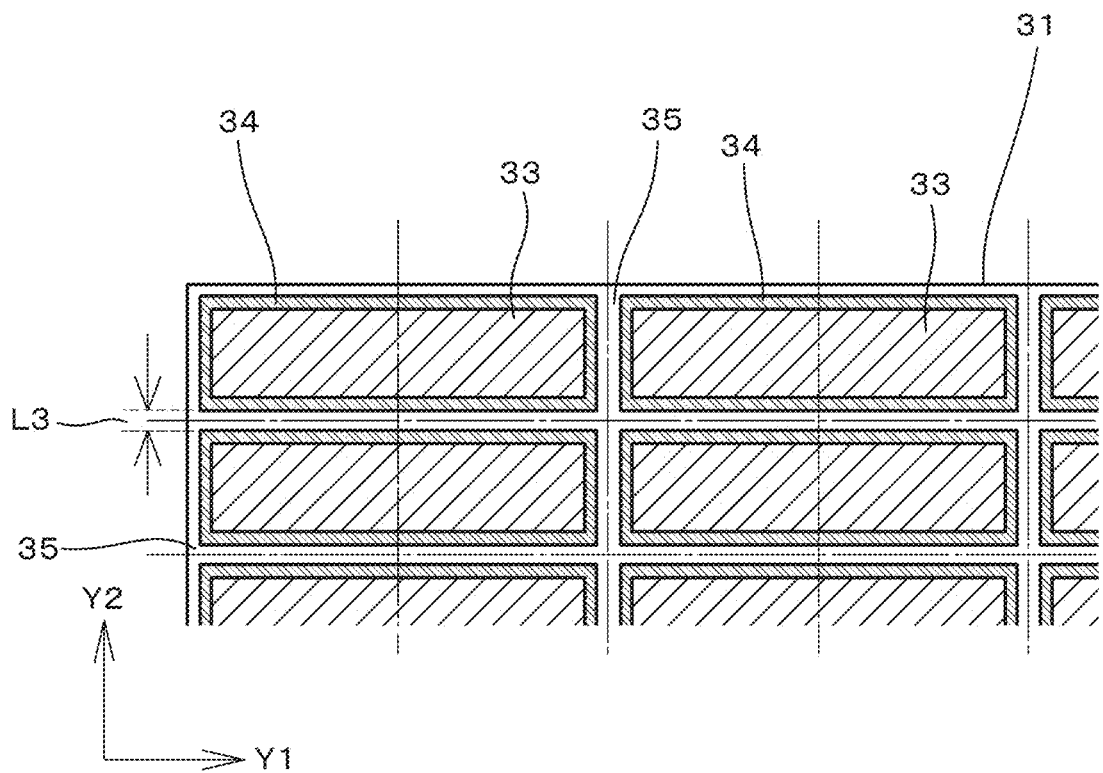
FIG. 8 is a plan view of a ceramic green sheet on which the internal electrode patterns have been formed and to which the ceramic paste has been applied.

FIG. 8 is a plan view of ceramic green sheet 31 on which internal electrode patterns 33 have been formed and to which ceramic paste 34 has been applied. Positions of chain-dotted lines in FIG. 8 show examples of cutting positions in the step of cutting ceramic green sheets 31 which will be described below.

Stepped region 35 located between two internal electrode patterns 33 adjacent to each other in second direction Y2 preferably has a dimension L3 of, for example, about 40 µm or more in second direction Y2, and has a dimension in first direction Y1 which is substantially equal to or greater than the dimension of each internal electrode pattern 33 in first direction Y1. That is, the forming of internal electrode patterns 33 in step S2 and the applying of ceramic paste 34 in step S3 are performed, and stepped region 35 located between two internal electrode patterns 33 adjacent to each other in second direction Y2 preferably has dimension L3 of, for example, about 40 µm or more in second direction Y2, and has a dimension in first direction Y1 which is substantially equal to or greater than the dimension of each internal electrode pattern 33 in first direction Y1.

Figure 9A:
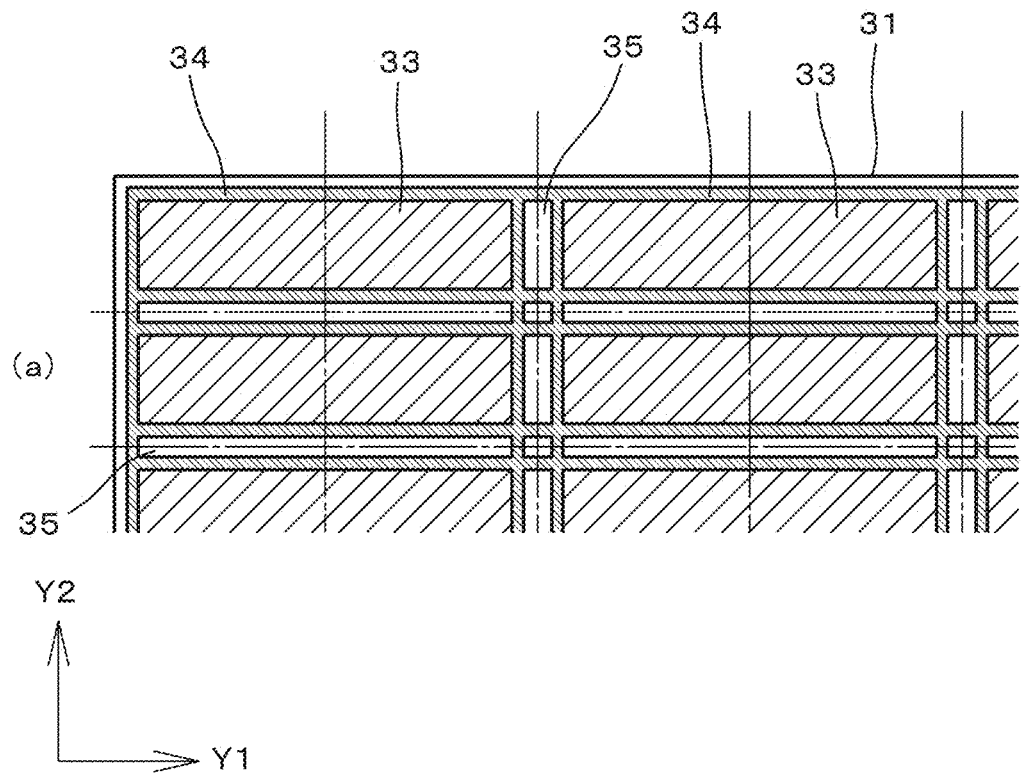
FIGS. 9A and 9B are plan views showing other examples of the ceramic green sheet on which the internal electrode patterns have been formed and to which the ceramic paste has been applied.
Figure 9B:
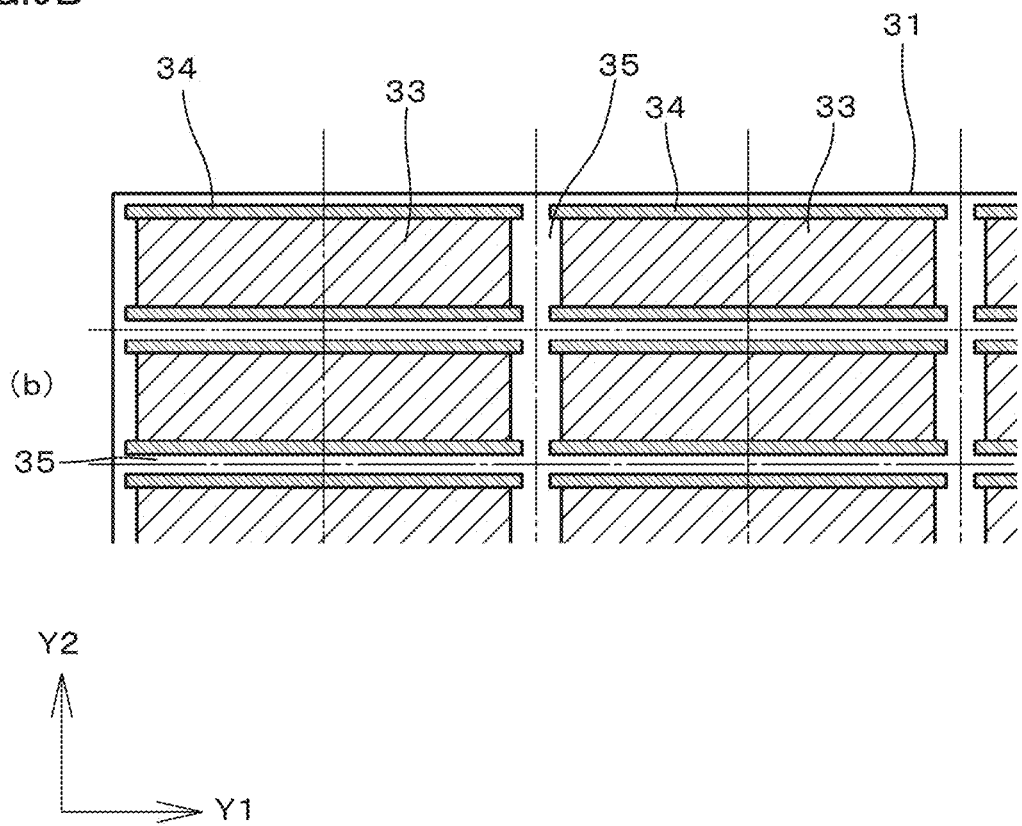

FIGS. 9A and 9B are plan views showing other examples of ceramic green sheet 31 on which internal electrode patterns 33 have been formed and to which ceramic paste 34 has been applied.

In the example shown in FIG. 8, ceramic paste 34 is applied for each internal electrode pattern 33, and portions of ceramic paste 34 applied respectively to adjacent internal electrode patterns 33 are spaced away from each other. In the example shown in FIG. 9A, on the other hand, portions of ceramic paste 34 applied respectively to adjacent internal electrode patterns 33 are continuous with one another. That is, ceramic paste 34 is continuously applied in both of first direction Y1 and second direction Y2.

In both examples shown in FIGS. 8 and 9A, ceramic paste 34 is applied to at least partially overlap the end portions of internal electrode patterns 33 that extend in the first direction and the end portions of internal electrode patterns 33 that extend in the second direction.

In the example shown in FIG. 9B, on the other hand, ceramic paste 34 is applied to at least partially overlap the end portions of internal electrode patterns 33 that extend in first direction Y1. That is, ceramic paste 34 is not applied onto the end portions of internal electrode patterns 33 that extend in second direction Y2.

That is, ceramic paste 34 is applied to at least partially overlap the end portions of internal electrode patterns 33 that extend in first direction Y1, or overlap the end portions of internal electrode patterns 33 that extend in first direction Y1 and the end portions of internal electrode patterns 33 that extend in second direction Y2. Also in the examples shown in FIGS. 9A and 9B, ceramic paste 34 is applied and stepped region 35 located between two internal electrode patterns 33 adjacent to each other in second direction Y2 has a dimension of about 40 μm or more in second direction Y2, and has a dimension in first direction Y1 which is substantially equal to or greater than the dimension of each internal electrode pattern 33 in first direction Y1.

FIGS. 10A to 10F are enlarged cross-sectional views around end portion 33b of internal electrode pattern 33 with different positions and amounts of applied ceramic paste 34 from those in the example shown in FIG. 7. Note that support film 32 is not shown in FIGS. 10A to 10F.

Figure 10A:
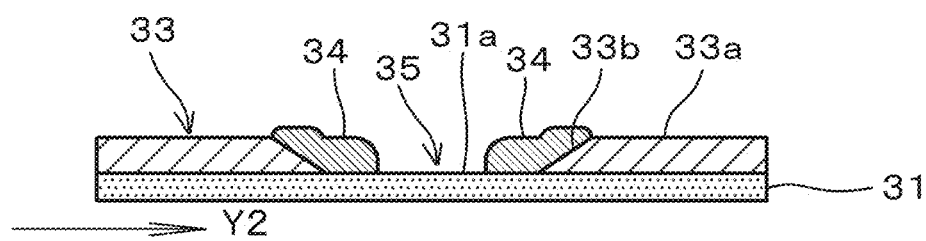
FIGS. 10A to 10F are enlarged cross-sectional views around the end portion of the internal electrode pattern with different positions and amounts of applied ceramic paste from those in the example shown in FIG. 7.

In the example shown in FIG. 10A, ceramic paste 34 is applied not only onto end portion 33b of internal electrode pattern 33, but also onto main surface 31a of ceramic green sheet 31. The position where ceramic paste 34 is applied on end portion 33b of internal electrode pattern 33 has a greater height than main portion 33a of internal electrode pattern 33.

Figure 10B:
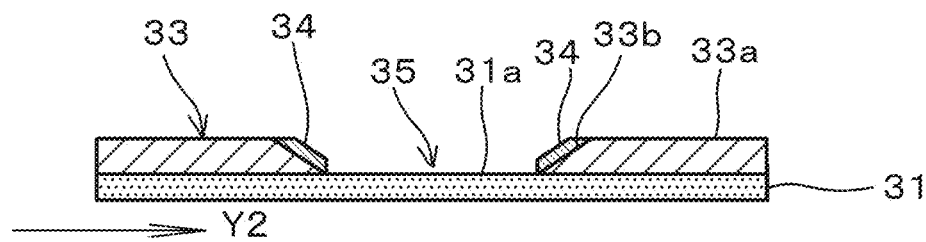

In the example shown in FIG. 10B, ceramic paste 34 is applied only onto end portion 33b of internal electrode pattern 33. Unlike the example shown in FIG. 7, however, there is a portion where the position where ceramic paste 34 is applied has a different height from main portion 33a of internal electrode pattern 33.

Figure 10C:
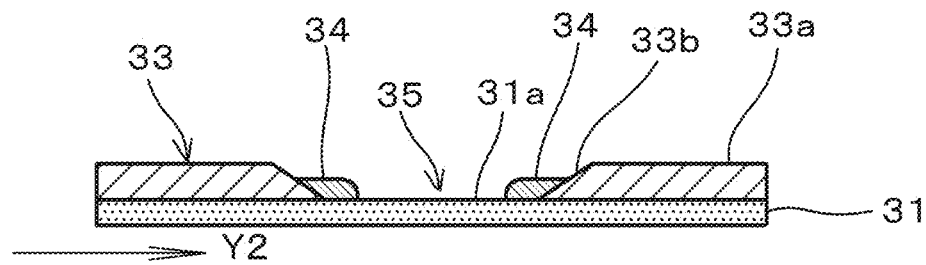

In the example shown in FIG. 10C, ceramic paste 34 is applied onto a portion of end portion 33b of internal electrode pattern 33 and a portion of main surface 31a of ceramic green sheet 31. As shown in FIG. 10C, there is a portion where ceramic paste 34 is not applied on end portion 33b of internal electrode pattern 33. The position where ceramic paste 34 is applied has a smaller height than main portion 33a of internal electrode pattern 33.

Figure 10D:
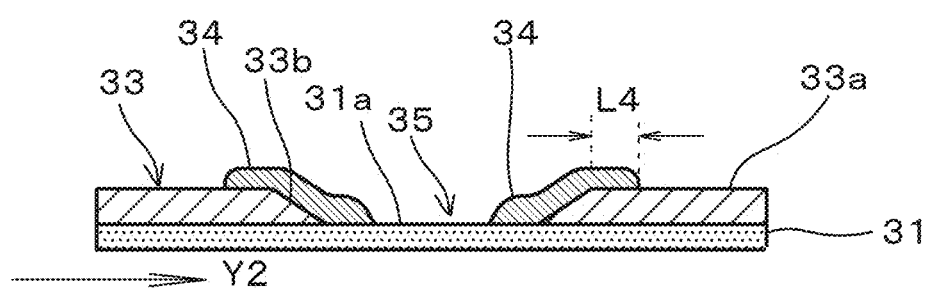

In the example shown in FIG. 10D, ceramic paste 34 is applied not only onto end portion 33b of internal electrode pattern 33, but also onto main surface 31a of ceramic green sheet 31 and a portion of main portion 33a of internal electrode pattern 33.

Herein, when one of ceramic paste 34 and internal electrode pattern 33 that is located on the lower side in the stacking direction at a position where ceramic paste 34 and internal electrode pattern 33 overlap each other is defined as a lower layer, and the other one that is located on the upper side is defined as an upper layer, a portion of the upper layer that is located on a main portion of the lower layer preferably has a dimension of about 40 μm or less in the second direction, for example.

In the first preferred embodiment, the upper layer is ceramic paste 34, and the lower layer is internal electrode pattern 33. Thus, a portion of ceramic paste 34 that is located on main portion 33a of internal electrode pattern 33 preferably has a dimension L4 of about 40 μm or less in second direction Y2, for example. With ceramic paste 34 having dimension L4 of about 40 μm or less, the promotion of a step is able to be significantly reduced or prevented, and an increase in amount of ceramic paste 34 that flows onto main portion 33a of internal electrode pattern 33 is able to be significantly reduced or prevented during pressing in a pressing step which will be described below, and a reduction in quality of multilayer ceramic capacitor 10 is able to be significantly reduced or prevented.

Figure 10E:
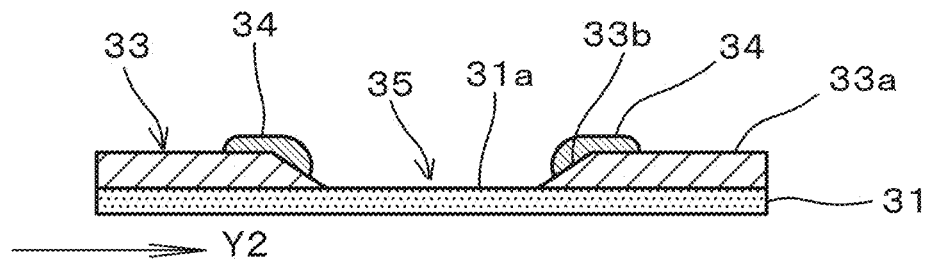

In the example shown in FIG. 10E, ceramic paste 34 is applied onto a portion of end portion 33b of internal electrode pattern 33 and a portion of main portion 33a of internal electrode pattern 33. As shown in FIG. 10E, there is a portion where ceramic paste 34 is not applied on end portion 33b of internal electrode pattern 33. In addition, a portion of ceramic paste 34 that is located on main portion 33a of internal electrode pattern 33 preferably has a dimension of about 40 μm or less in second direction Y2, for example.

Figure 10F:
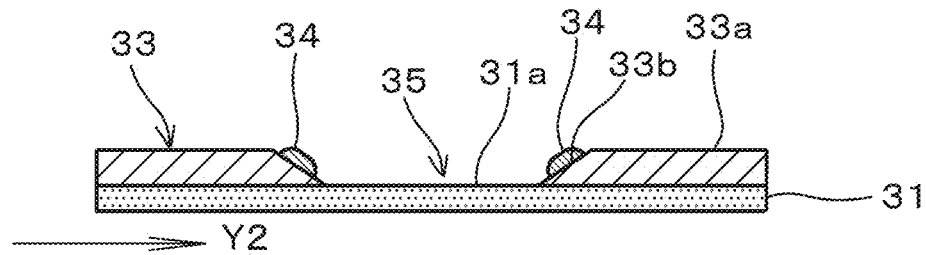

In the example shown in FIG. 10F, ceramic paste 34 is applied only onto a portion of end portion 33b of internal electrode pattern 33. As shown in FIG. 10F, there is a portion where ceramic paste 34 is not applied on end portion 33b of internal electrode pattern 33.

Figure 6D:
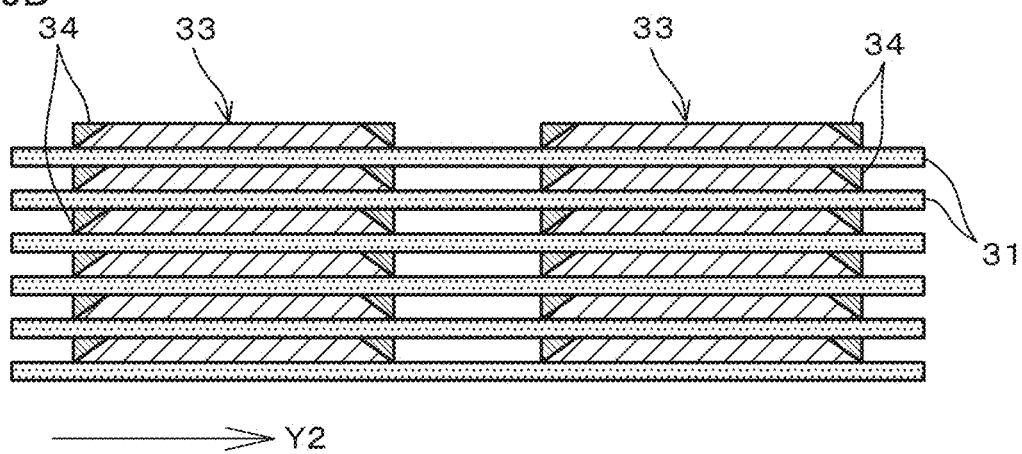

In step S4 of FIG. 5, the plurality of ceramic green sheets 31 on which internal electrode patterns 33 have been formed and to which ceramic paste 34 has been applied are stacked (see FIG. 6D). The stacking is performed with ceramic green sheet 31 peeled from support film 32. Ceramic green sheets 31 on which internal electrode patterns 33 have not been formed may be stacked on the opposite outer sides in the stacking direction.

In step S5, the plurality of stacked ceramic green sheets 31 are pressed. Examples of pressing methods include hydrostatic pressing and rigid body pressing.

As described above, ceramic paste 34 is applied to at least partially overlap end portion 33b of internal electrode pattern 33. Therefore, the deformation of end portion 33b of internal electrode pattern 33 is able to be significantly reduced or prevented during the pressing.

In addition, even when ceramic paste 34 is applied to extend onto main portion 33a of internal electrode pattern 33 due to printing misalignment as shown in FIGS. 10D and 10E, ceramic paste 34 applied onto main portion 33a moves toward stepped region 35 by the pressing, and the promotion of a step is able to be significantly reduced or prevented. In particular, with stepped region 35 located between two internal electrode patterns 33 adjacent to each other in second direction Y2 preferably having a dimension of, for example, about 40 μm or more in second direction Y2, and having a dimension in first direction Y1 which is substantially equal to or greater than the dimension of each internal electrode pattern 33 in first direction Y1, a region where ceramic paste 34 applied onto main portion 33a is movable is able to be secured, and the promotion of a step is able to be significantly reduced or prevented.

In addition, since stepped region 35 is provided on main surface 31a of ceramic green sheet 31, the portion where stepped region 35 is provided is compressed, by the pressing, compared to the portion where internal electrode pattern 33 is formed. In a completed multilayer ceramic electronic component, therefore, portions where internal electrodes 13a and 13b are not present are bent to have obtuse corners, as shown in FIG. 3. Thus, the occurrence of a crack starting from the corner is able to be significantly reduced or prevented, and delamination in the region where internal electrodes 13a and 13b are not present is able to be significantly reduced or prevented.

In step S6, the plurality of pressed ceramic green sheets 31 are cut. The plurality of pressed ceramic green sheets 31 are cut in both of first direction Y1 and second direction Y2. Positions of chain-dotted lines in FIG. 8 show examples of cutting positions. When cutting ceramic green sheets 31 in first direction Y1, the cutting is performed at the position of stepped region 35 between two internal electrode patterns 33 adjacent to each other in the second direction.

In step S7, chips provided by the cutting are fired. Subsequently, external electrodes may be formed.

A multilayer ceramic electronic component according to a preferred embodiment of the present invention is provided through the steps described above.

Figure 11:
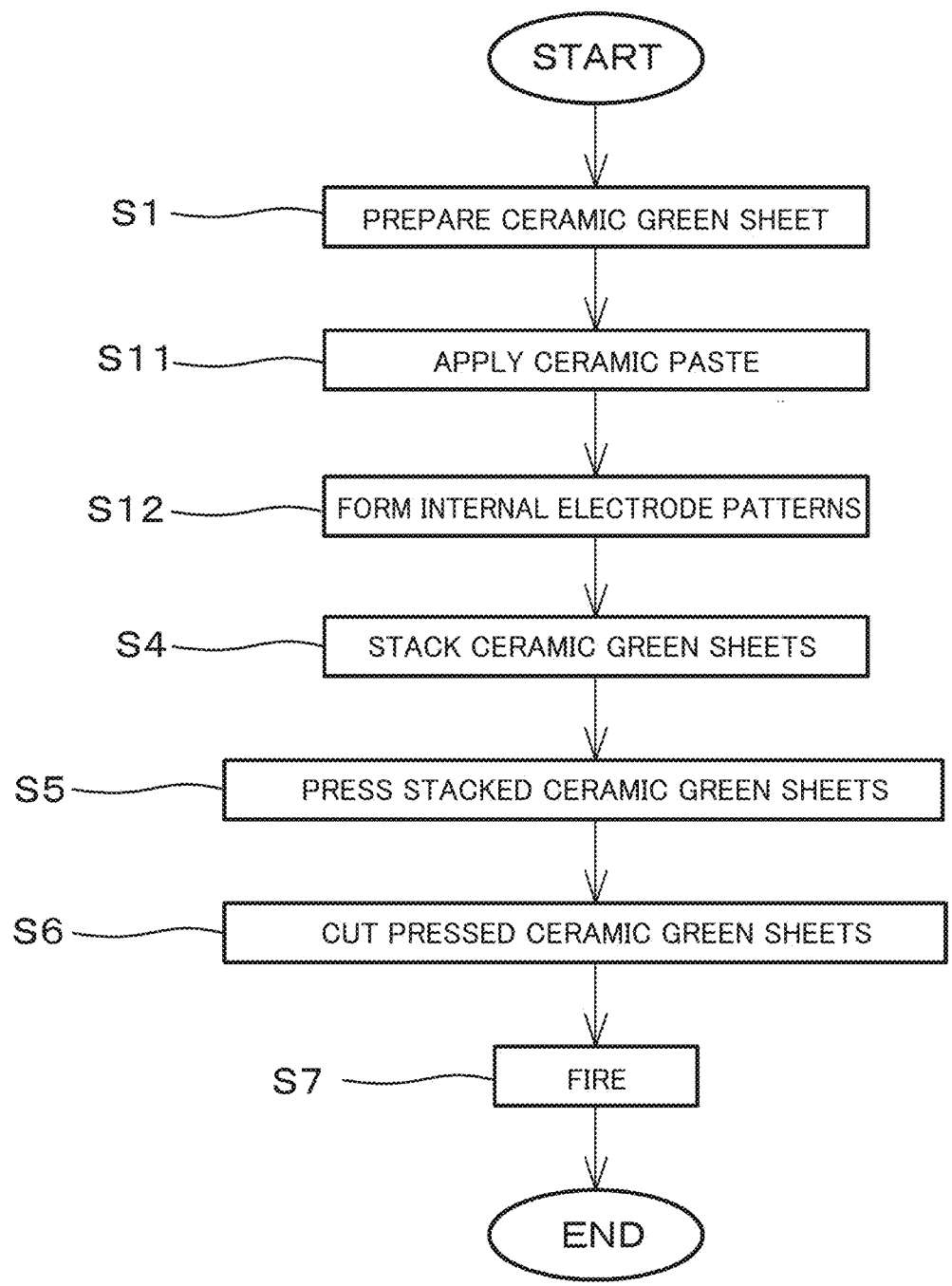
FIG. 11 is a flowchart showing a method for manufacturing a multilayer ceramic electronic component in a second preferred embodiment of the present invention.

FIG. 11 is a flowchart showing a method for manufacturing a multilayer ceramic electronic component in a second preferred embodiment of the present invention. In the flowchart shown in FIG. 11, steps where the same or similar processing as the processing of the flowchart shown in FIG. 5 is performed are shown by the same reference characters and will not be described in detail.

In the method for manufacturing the multilayer ceramic electronic component in the first preferred embodiment, ceramic paste 34 is applied after internal electrode patterns 33 have been formed on main surface 31a of ceramic green sheet 31. In the method for manufacturing the multilayer ceramic electronic component in the second preferred embodiment, on the other hand, internal electrode patterns 33 are formed after ceramic paste 34 has been applied onto main surface 31a of ceramic green sheet 31.

Figure 12A:
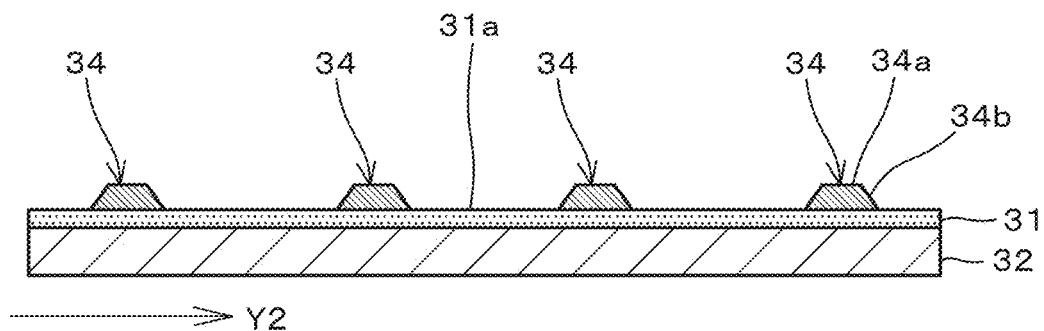
FIGS. 12A and 12B show manufacturing steps of the method for manufacturing the multilayer ceramic electronic component in the second preferred embodiment of the present invention.

In step S11 following step S1 in the flowchart shown in FIG. 11, ceramic paste 34 is applied onto main surface 31a of ceramic green sheet 31 (see FIG. 12A). Ceramic paste 34 includes a main portion 34a, and an end portion 34b located on an outer side of main portion 34a and having a smaller thickness than main portion 34a.

Figure 12B:
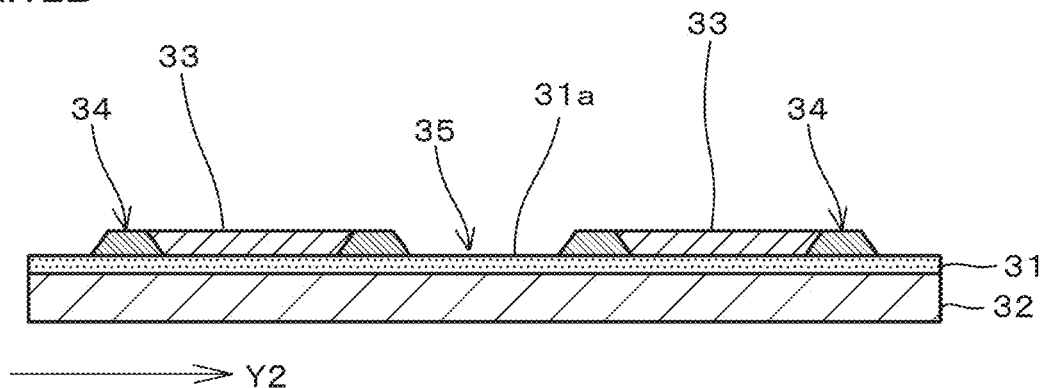

In step S12 following step S11, the plurality of internal electrode patterns 33 are formed on main surface 31a of ceramic green sheet 31 (see FIG. 12B). Also in the second preferred embodiment, ceramic paste 34 is applied to at least partially overlap end portion 33b of internal electrode pattern 33. In the second preferred embodiment, since internal electrode patterns 33 are formed after ceramic paste 34 has been applied, end portion 33b of internal electrode pattern 33 overlaps a portion of ceramic paste 34, more specifically, end portion 34b of ceramic paste 34.

Also in the second preferred embodiment, the forming of internal electrode patterns 33 and the applying of ceramic paste 34 are performed, and stepped region 35 located between two internal electrode patterns 33 adjacent to each other in second direction Y2 preferably has a dimension of, for example, about 40 μm or more in second direction Y2, and has a dimension in first direction Y1 which is substantially equal to or greater than the dimension of each internal electrode pattern 33 in first direction Y1.

Figure 13:
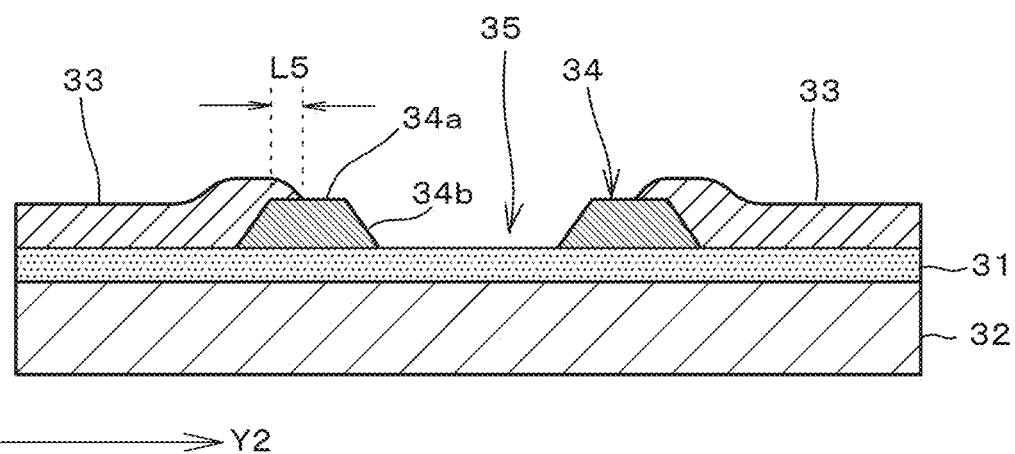
FIG. 13 shows a state where the internal electrode pattern extends onto a main portion of the ceramic paste.

Herein, as shown in FIG. 13, internal electrode pattern 33 may extend onto main portion 34a of ceramic paste 34 due to printing misalignment. Accordingly, when one of ceramic paste 34 and internal electrode pattern 33 that is located on the lower side in the stacking direction at a position where ceramic paste 34 and internal electrode pattern 33 overlap each other is defined as a lower layer, and the other one that is located on the upper side is defined as an upper layer, a portion of the upper layer that is located on a main portion of the lower layer preferably has a dimension of about 40 μm or less in the second direction, for example.

In the second preferred embodiment, the upper layer is internal electrode pattern 33, and the lower layer is ceramic paste 34. Thus, a portion of internal electrode pattern 33 that is located on main portion 34a of ceramic paste 34 preferably has a dimension L5 of about 40 μm or less in second direction Y2, for example. With internal electrode pattern 33 having dimension L5 of about 40 μm or less, the promotion of a step is able to be significantly reduced or prevented.

Processing of step S4 and the subsequent steps following step S12 is the same as or similar to the processing of step S4 and the subsequent steps in the flowchart shown in FIG. 5.

The present invention is not limited to the preferred embodiments described above, and a variety of applications or variations may be implemented within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component having a structure including a stack of a plurality of ceramic layers and a plurality of internal electrodes, the multilayer ceramic electronic component comprising:
   the plurality of ceramic layers;
   the plurality of internal electrodes; and
   an electrode-end-portion protecting portion including ceramic material and at least partially overlapping each end portion of the plurality of internal electrodes; wherein
   the electrode-end-portion protecting portion is not exposed at any surface of the multilayer ceramic electronic component;
   the electrode-end-portion protecting portion does not extend to end of the plurality of ceramic layers; and
   the electrode-end-portion protecting portion is stacked on at least one end portion of the plurality of internal electrodes in a stacking direction of the plurality of ceramic layers and the plurality of internal electrodes without the plurality of ceramic layers being provided between the electrode-end-portion protecting portion and the at least one end portion of the plurality of internal electrodes.

2. A multilayer ceramic electronic component having a structure including a stack of a plurality of ceramic layers and a plurality of internal electrodes, the multilayer ceramic electronic component comprising:
   the plurality of ceramic layers;
   the plurality of internal electrodes; and
   an electrode-end-portion protecting portion including ceramic material and at least partially overlapping each end portion of the plurality of internal electrodes; wherein
   the electrode-end-portion protecting portion is not exposed at any surface of the multilayer ceramic electronic component;
   the electrode-end-portion protecting portion does not extend to end of the plurality of ceramic layers; and
   the electrode-end-portion protecting portion is provided directly on at least one end portion of the plurality of internal electrodes and at least partially overlaps the at least one end portion of the plurality of internal electrodes in a stacking direction of the plurality of ceramic layers and the plurality of internal electrodes.

3. A multilayer ceramic electronic component having a structure including a stack of a plurality of ceramic layers and a plurality of internal electrodes, the multilayer ceramic electronic component comprising:
   the plurality of ceramic layers;
   the plurality of internal electrodes; and an electrode-end-portion protecting portion including ceramic material and at least partially overlapping each end portion of the plurality of internal electrodes; wherein the electrode-end-portion protecting portion is not exposed at any surface of the multilayer ceramic electronic component;

the electrode-end-portion protecting portion does not extend to end of the plurality of ceramic layers; and a surface of at least a portion of at least one end portion of the plurality of internal electrodes overlapping the electrode-end-portion protecting portion is slanted.

* * * * *